United States Patent [19]

Ogura

[11] Patent Number: 5,481,456
[45] Date of Patent: Jan. 2, 1996

[54] ELECTRONIC CONTROL SYSTEM HAVING MASTER/SLAVE CPUS FOR A MOTOR VEHICLE

[75] Inventor: Akira Ogura, Musashino, Japan

[73] Assignee: Fuji Jukogyo Kabushiki Kaisha, Tokyo, Japan

[21] Appl. No.: 365,328

[22] Filed: Dec. 28, 1994

Related U.S. Application Data

[63] Continuation of Ser. No. 765,684, Sep. 26, 1991, abandoned.

[30] Foreign Application Priority Data

Sep. 4, 1990 [JP] Japan ................................. 4-236873

[51] Int. Cl.⁶ ................................................ H04L 27/00
[52] U.S. Cl. ...................... 364/424.01; 364/132; 477/97
[58] Field of Search ................................. 364/132, 138, 364/424.01, 424.03, 424.1, 432, 431.04; 477/97

[56] References Cited

U.S. PATENT DOCUMENTS

| | | | |
|---|---|---|---|
| 4,432,064 | 2/1984 | Barker et al. | 364/132 X |
| 4,507,735 | 3/1985 | Moorehead et al. | 364/132 X |
| 4,700,292 | 10/1987 | Campanini | 364/132 X |
| 4,715,012 | 12/1987 | Mueller, Jr. | 364/900 |
| 4,730,256 | 3/1988 | Niimi et al. | 364/132 X |
| 4,744,218 | 5/1988 | Edwards | 60/368 |
| 4,745,744 | 5/1988 | Cherry et al. | 364/132 X |
| 4,811,561 | 3/1989 | Edwards | 60/368 |
| 4,945,481 | 7/1990 | Iwatsuki et al. | 74/866 X |
| 4,966,049 | 10/1990 | Takahashi | 74/866 |
| 5,005,441 | 4/1991 | Narita | 74/866 |
| 5,012,696 | 5/1991 | Miyawaki | 74/866 |
| 5,053,964 | 10/1991 | Mister et al. | 364/424.01 |
| 5,072,374 | 12/1991 | Sexton et al. | 364/132 X |
| 5,087,308 | 4/1991 | Narita | 74/866 |
| 5,105,360 | 4/1992 | Akiyama | 364/426.03 |
| 5,132,905 | 7/1992 | Takai et al. | 364/132 X |
| 5,154,151 | 10/1992 | Bradshaw et al. | 123/481 |
| 5,224,124 | 6/1993 | Hamano et al. | 364/424.01 X |

FOREIGN PATENT DOCUMENTS

| | | | |
|---|---|---|---|
| 0247335 | 2/1987 | European Pat. Off. . | |
| 55-4633 | 1/1980 | Japan | 364/132 |
| 204907 | 12/1982 | Japan | 364/132 |
| 58-66147 | 4/1983 | Japan | 364/132 |
| 178468 | 10/1983 | Japan | 364/132 |
| 208666 | 11/1984 | Japan | 364/132 |
| 48504 | 4/1985 | Japan | 364/132 |
| 65372 | 4/1985 | Japan | 364/132 |
| 147863 | 8/1985 | Japan | 364/132 |
| 239857 | 11/1985 | Japan | 364/132 |
| 2127586 | 9/1982 | United Kingdom . | |

*Primary Examiner*—Khoi Q. Ta
*Attorney, Agent, or Firm*—Beveridge, DeGrandi, Weilacher & Young

[57] ABSTRACT

An electronic control system for a motor vehicle, having multiple sensors (M1) for detecting the operating condition parameters of the motor vehicle; a master controller (M4) from and to which communication lines are laid; and a plurality of slave controllers (M2) which convert the operating condition parameters detected by the sensors (M1) and various data items processed in the control system, into serial data items and transmit them to the master controller (M4) through the communication lines, and which control a plurality of components (M3) installed on the motor vehicle, on the basis of data items received from the master controller (M4); the master controller (M4) being connected with the plurality of slave controllers (M2) through the communication lines, to calculate controlling data items on the basis of various data items received as inputs from the respective slave controllers (M2), and converting the controlling data items into the serial data items and transmitting them to the respective slave controllers (M2) through the communication lines.

13 Claims, 7 Drawing Sheets

ELECTRONIC CONTROL SYSTEM HAVING MASTER/SLAVE CPUS FOR A MOTOR VEHICLE

This application is a continuation of application Ser. No. 07/765,684, filed Sep. 26, 1991, now abandoned, which application is entirely incorporated herein by reference.

BACKGROUND OF THE INVENTION

1. Field of the Invention

The present invention relates to an electronic control system for a motor vehicle in which a plurality of controllers are connected by serial communication lines.

2. Description of the Prior Art

In recent years, microcomputers have come to be installed on motor vehicles such as automobiles. The microcomputers have been used in, for example, an engine control, a transmission control and a brake control, and have brought forth the rapid progress of control functions.

Subsequently, such a system wherein the plurality of microcomputers perform the individual controls independently has developed into a system wherein a plurality of microcomputers are coupled by a serial channel so as to organize a network and to interchange required data items through serial transmission. Byway of example, the official gazette of Japanese Patent Application Laid-open No. 237895/1987 discloses a technique wherein a plurality of controllers are connected by a serial data link, and even when data items from sensors are simultaneously required in the individual controllers, they are transferred through a single communication line, thereby to reduce the number of wiring lines in an automobile.

However, with the independent distributed processing system wherein the plurality of microcomputers are merely coupled by the communication network, the adjustments of tasks among the microcomputers are difficult, and the overhead of each microcomputer in case of communication increases, granted that the sharing of data and the reduction of the number of wiring lines can be achieved.

Further, regarding a system wherein computers of different capabilities are coexistent, etc., there are the problems that the throughput of the whole system might lower and that the integration of the whole control system is difficult.

SUMMARY OF THE INVENTION

The present invention has been made in view of the above circumstances, and has for its object to provide an electronic control system for a motor vehicle in which the control data items of a plurality of controllers installed on the motor vehicle are managed in centralized fashion, whereby the control system can be integrated, and the number of wiring lines for each controller can be reduced.

As shown in FIG. 1, an electronic control system for a motor vehicle according to the present invention consists in comprising a plurality of parameter detecting means M1 for detecting operating condition parameters of the motor vehicle; a master controller M4 from and to which communication lines are laid; and a plurality of slave controllers M2 which convert the operating condition parameters detected by said parameter detecting means M1 and various data items processed in said control system, into serial data items and transmit them to said master controller M4 through said communication lines, and which control a plurality of components M3 installed on the motor vehicle, on the basis of data items received from said master controller M4; said master controller M4 being connected with said plurality of slave controllers M2 through said communication lines, to calculate controlling data items on the basis of various data items received as inputs from the respective slave controllers M2, and converting the controlling data items into the serial data items and transmitting them to said respective slave controllers M2 through said communication lines.

In the electronic control system for a motor vehicle constructed as described above, the slave controllers M2 convert the operating condition parameters of the motor vehicle detected by the parameter detecting means M1 or the various data items processed in the control system, into the serial data items and then transmit them to the master controller M4 through the communication lines.

In the master controller M4, the controlling data items are calculated on the basis of the various data items from the individual slave controllers M2 and are converted into the serial data items, which are transmitted to the respective slave controllers M2 through the communication lines.

Subsequently, upon receiving the data items from the master controller M4, the respective slave controllers M2 control the plurality of components M3 installed on the motor vehicle, on the basis of these data items.

PREFERRED EMBODIMENT OF THE INVENTION

Now, an embodiment of the present invention will be described with reference to the drawings.

Figure 1:
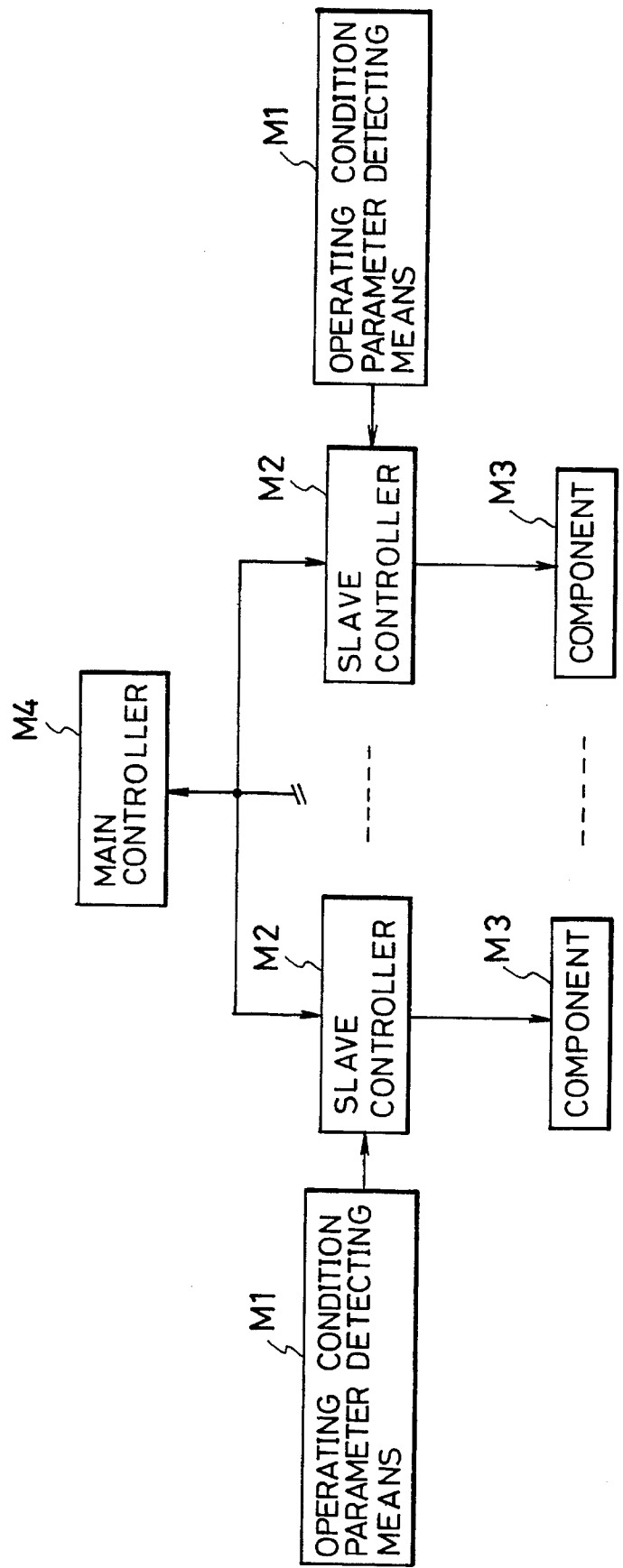
FIG. 1 is a conceptual diagram showing the fundamental construction of the present invention.
Figure 2:
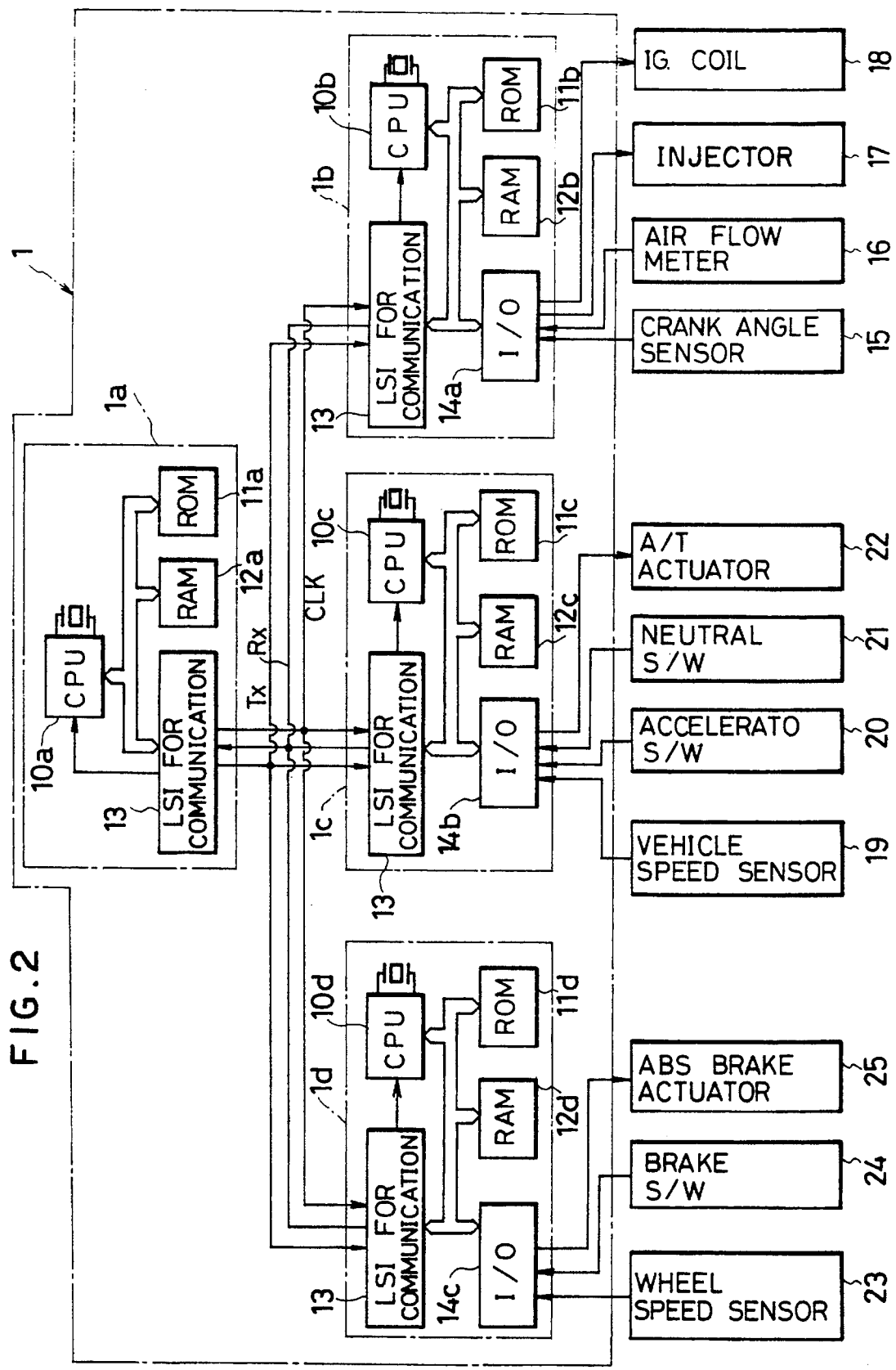
FIG. 2 is an architectural diagram of an embodiment of an electronic control system for a motor vehicle according to the present invention.
Figure 3:
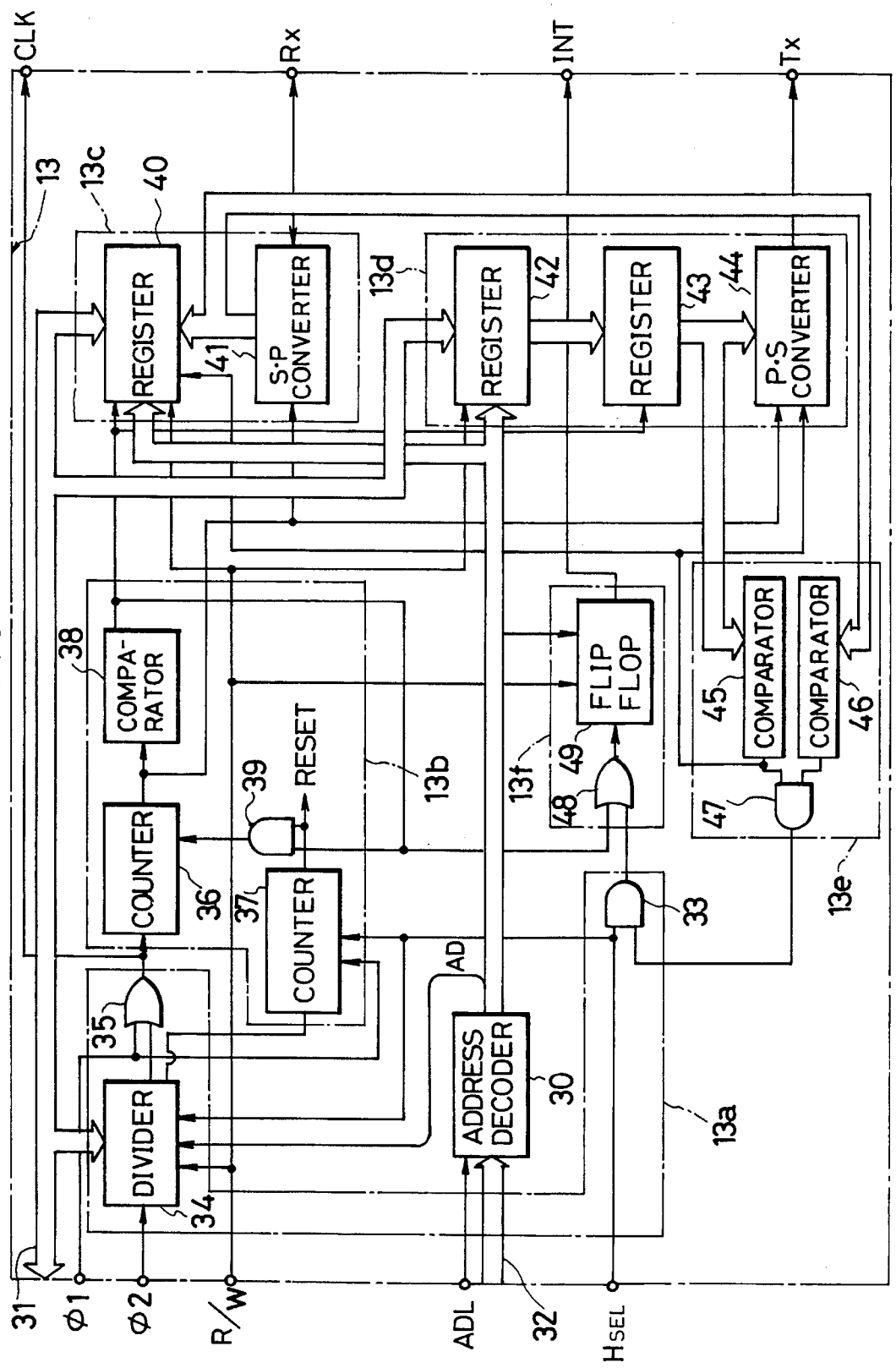
FIG. 3 is a circuit block diagram of an LSI for communication included in the embodiment.
Figure 4:
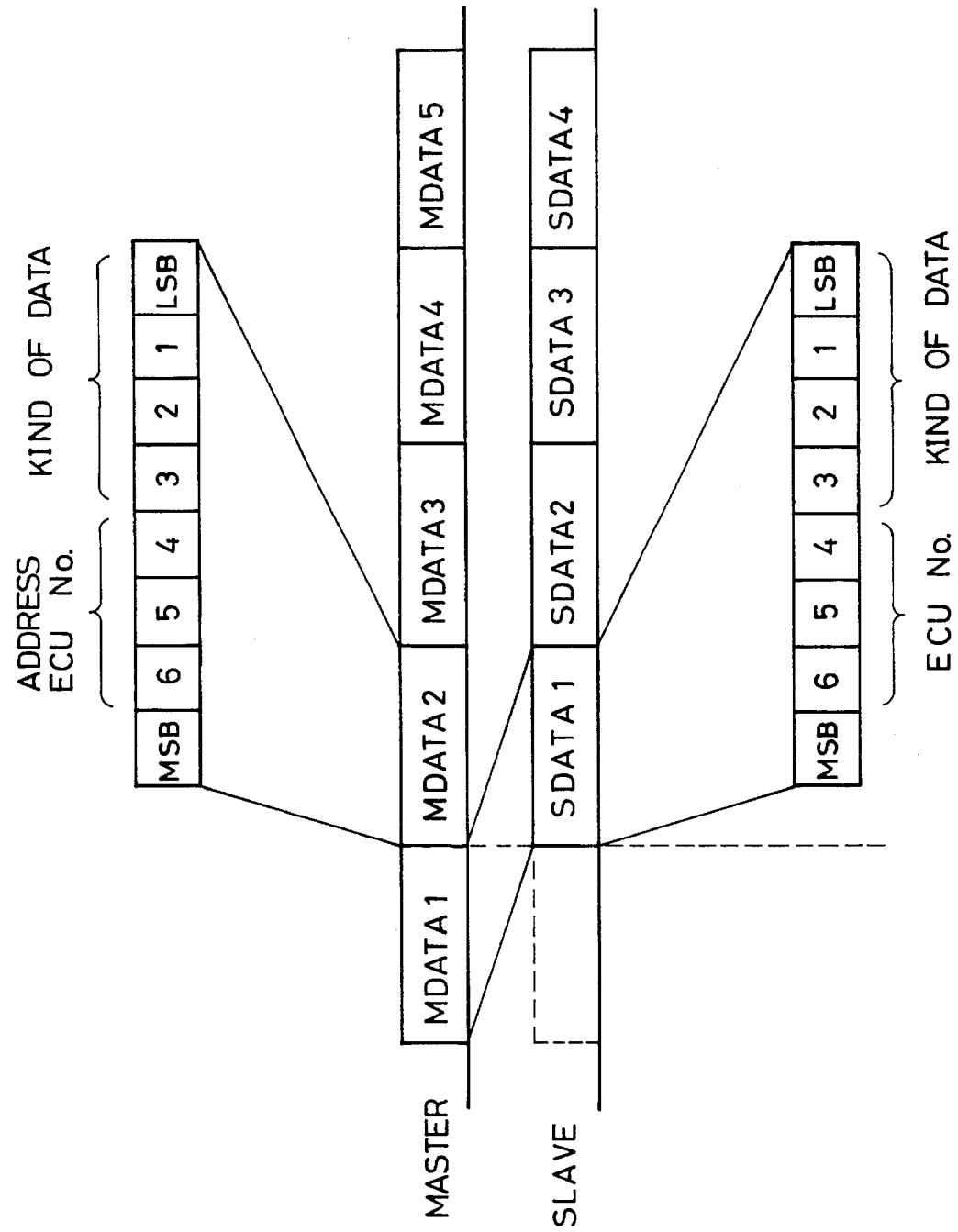
FIG. 4 is an explanatory diagram showing a communication format in the embodiment.
Figure 5:
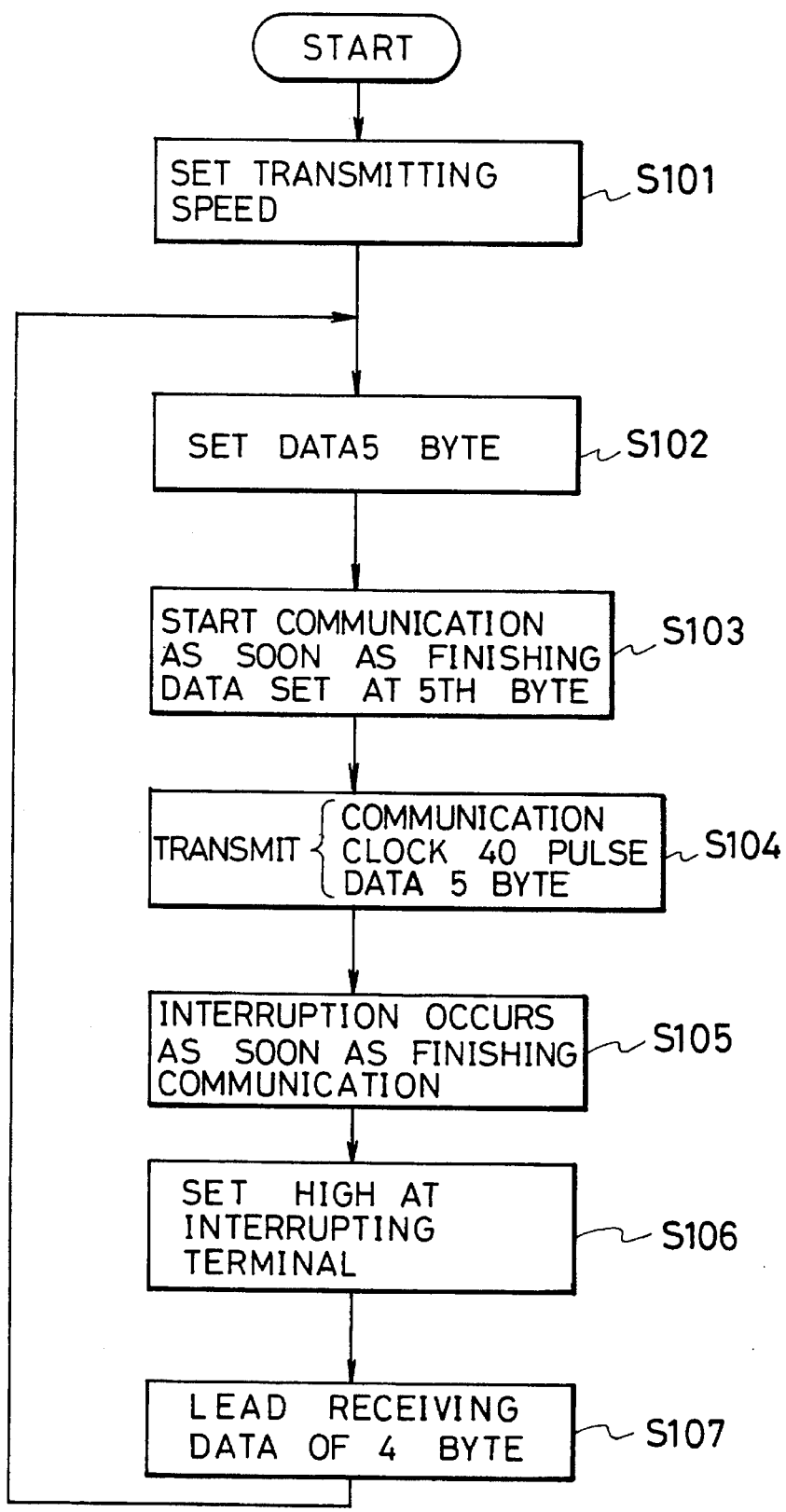
FIG. 5 is a flow chart showing the communicating steps of a master ECU included in the embodiment.
Figure 6A:
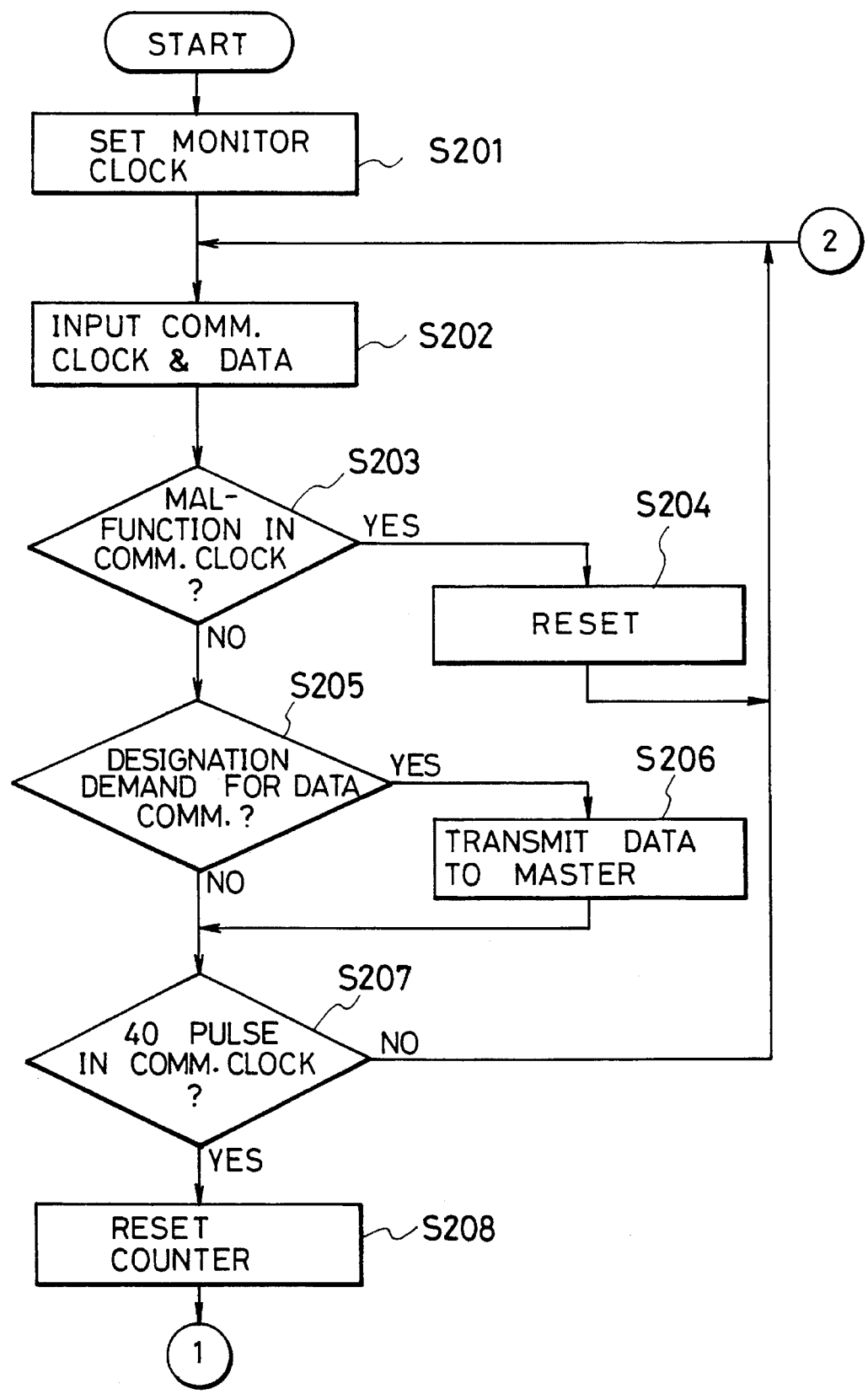
FIG. 6A and B is a flow chart showing the communicating steps of a slave ECU included in the embodiment.
Figure 6B:
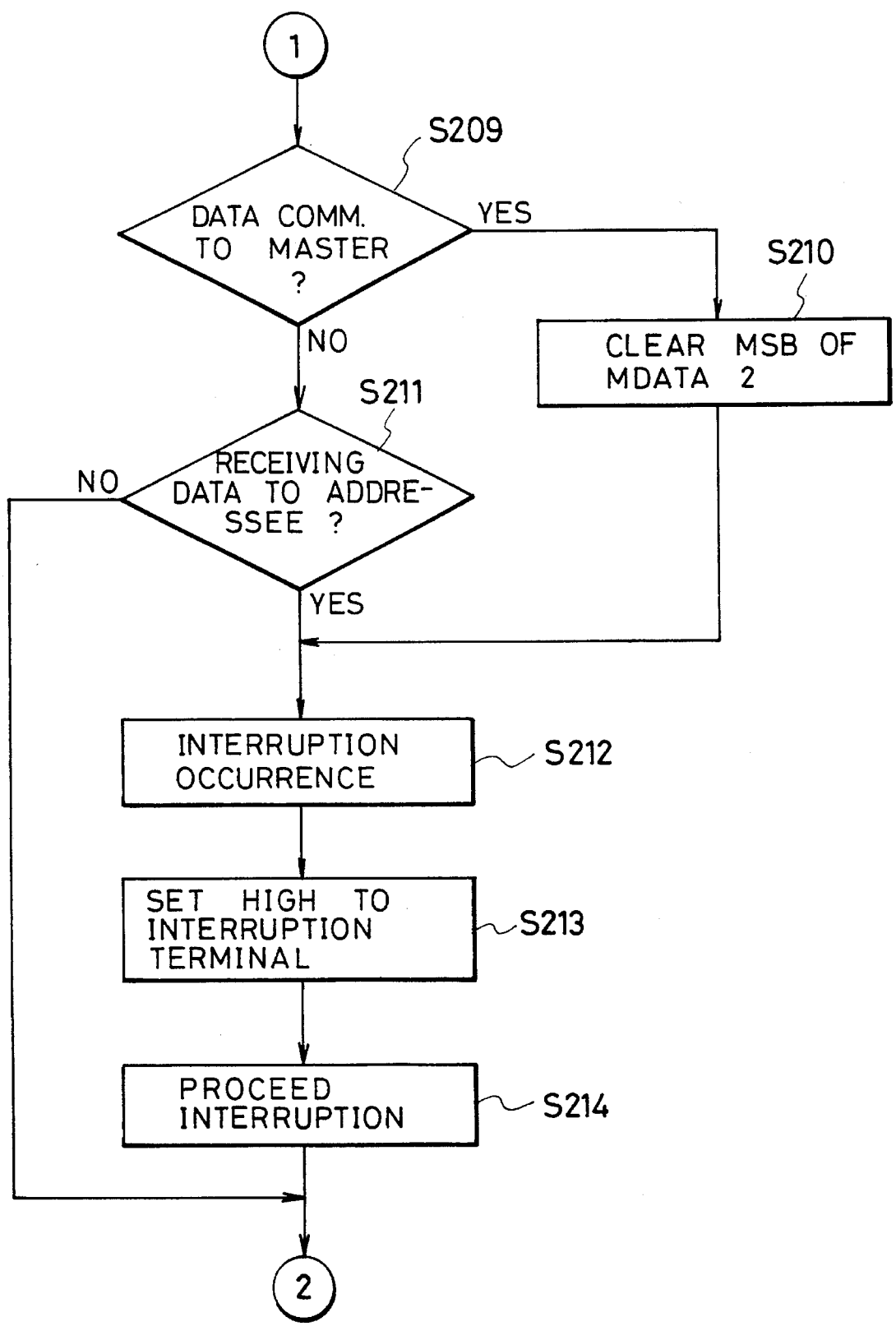

FIGS. 2 et seq. illustrate an embodiment of the present invention, in which FIG. 2 is an architectural diagram of an electronic control system for a motor vehicle according to the present invention; FIG. 3 is a circuit block diagram of an LSI for communication; FIG. 4 is an explanatory diagram showing a communication format; FIG. 5 is a flow chart showing the communicating steps of a master ECU; and FIG. 6 is a flow chart showing the communicating steps of a slave ECU.

(System Architecture)

Referring to FIG. 2, numeral 1 indicates a group of computers which are installed on a motor vehicle such as automobile. These computers 1 organize a communication network in such a manner that a master controller (master ECU) 1a is coupled by a serial channel with a plurality of slave controllers (slave ECUs) 1b, 1c and 1d which consist of, for example, an engine controller, a transmission controller and a brake controller.

The master ECU 1a is so constructed that a master CPU 10a of, for example, 16 bits or 32 bits, a ROM 11a, a RAM 12a, and an LSI for communication 13 are interconnected.

On the other hand, the slave ECUs 1b, 1c and 1d are so constructed that slave CPUs 10b, 10c, 10d of, for example, 8 bits; ROMs 11b, 11c, 11d; RAMs 12b, 12c, 12d; I/O interfaces 14a, 14b, 14c; and the LSIs for communication 13 are similarly connected, respectively.

In the slave ECU 1b, sensors being parameter detecting means, such as a crank angle sensor 15 and an air flow meter 16, are connected to the input ports of the I/O interface 14a, while actuators being components, such as an injector 17 and an ignition coil 18, are connected to the output ports thereof.

In addition, sensors and switches, such as a vehicle speed sensor 19, an accelerator switch 20 and a neutral switch 21, are connected to the input ports of the I/O interface 14b of the slave ECU 1c, while actuators, such as an A/T actuator 22, are connected to the output ports thereof.

Further, sensors and switches, such as a wheel speed sensor 23 and a brake switch 24, are connected to the input ports of the I/O interface 14c of the slave ECU 1d, while actuators, such as an ABS brake actuator 25, are connected to the output ports thereof.

The ROM 11a connected to the master CPU 10a of the master ECU 1a stores therein various computing programs for, e.g., the calculation of fuel injection quantities and the calculation of ignition timings. On the other hand, the ROMs 11b–11d connected to the corresponding slave CPUs 10b–10d of the slave ECUs 1b–1d store therein control programs for the engine control, the transmission control and the brake control, respectively, which are based on the calculation of operating condition parameters and the calculated results of the master ECU 1a.

The master ECU 1a and the slave ECUs 1b–1d are coupled to one another by the serial communication channel through the same LSIs for communication 13. The LSI for communication 13 built in the master ECU 1a is used in a master operation mode, while those built in the slave ECUs 1b–1d are used in a slave operation mode.

More specifically, the master CPU 10a requests the individual slave CPUs 10b–10d to deliver various parameters necessary for the calculations, for example, an engine speed N and a suction air flow Q, through the LSI for communication 13 operating in the master operation mode. It executes the various calculations of, for example, fuel injection pulse widths Ti and the ignition timings θ on the basis of the various parameters received from the slave ECUs 1b–1d, and transmits the calculated data items to the corresponding slave CPUs 10b–10d through the above LSI for communication 13.

On the other hand, the individual slave CPUs 10b–10d comply with the requests of the master ECU 1a and transmit the operating condition parameters based on output signals from the various sensors (parameter detecting means), to the master CPU 10a through the LSIs for communication 13 operating in the slave operation mode. Also, they receive the various data items calculated by the master CPU 10a and supply the various actuators (components) with control signals at predetermined timings on the basis of the received data items, for example, the control data items of the fuel injection quantities Ti and the ignition timings θ.

On this occasion, the serial communication channel is started by the master ECU 1a and has its timing determined by a clock signal CLK which is supplied from the LSI for communication 13 of the master ECU 1a to the individual slave ECUs 1b–1d. As a result, the data items are interchanged by bidirectional clocked communications based on a transmission signal Tx and a reception signal Rx.
(Circuit Arrangement of LSI for Communication)

As shown in FIG. 3, the LSI for communication 13 is an LSI for an on-vehicle network which is configured of a master/slave selector circuit 13a, a communication control circuit 13b, a receiver circuit 13c, a transmitter circuit 13d, a comparison circuit 13e and an interrupt generator circuit 13f, and in which hardware elements such as an address decoder 30 and gates, a flip-flop and counters are integrated on an identical chip. The communication network among the on-vehicle computers can be realized very easily by assembling such chips into the respective ECUs installed on the vehicle.

The LSI for communication 13 is connected with the corresponding one of the CPUs 10a–10d of the respective ECUs 1a–1d through a data bus 31 as well as an address bus 32. It is supplied with a system clock ø 2, a read/write signal R/W, an address latch signal ADL, a master/slave select signal $H_{SEL}$, etc. from the side of the connected one of the CPUs 10a–10d. Thus, it performs the communication controls of the reception data Rx and transmission data Tx in the serial communication channel started by the master CPU 10a, and it produces an interrupt signal INT after a predetermined communicating operation. By the way, a clock ø 1 is a communication clock which is received from the master in the slave mode.

The master/slave selector circuit 13a is a circuit for selecting the master operation mode and the slave operation mode. The master/slave select signal $H_{SEL}$ is applied to an AND gate 33 and a frequency divider 34, a frequency division output from the frequency divider 34 and the input of the clock ø 1 are applied to an OR gate 35, and the communication clock CLK is delivered within and of the LSI for communication 13.

The frequency divider 34 is supplied with the system clock ø 2. In the master operation mode, it divides the frequency of the system clock ø 2 at a frequency division ratio based on data written through the data bus 31 by the master CPU 10a, and depending upon the host select signal $H_{SEL}$, an address decode signal AD and the read/write signal R/W, whereupon it delivers the communication clock CLK.

Besides, in the slave operation mode, the frequency divider 34 divides the frequency of the system clock ø 2 and delivers a monitor clock $S_{CLK}$ for detecting the malfunction of the externally applied clock ø 1, namely, the communication clock CLK.

The communication control circuit 13b is constituted by counters 36, 37, a comparator 38 and an AND gate 39. The output pulses from the OR gate 35 of the master/slave selector circuit 13a are counted by the counter 36, and the count value is delivered to the comparator 38 and also to the receiver circuit 13c as well as the transmitter circuit 13d.

The comparator 38 compares the count number of the counter 36 with a predetermined number of bits, and it decides whether or not the data transmission or reception of the predetermined number of bits has been finished. Upon deciding the finish, it delivers a communication finish signal to the interrupt generator circuit 13f.

Besides, in the slave operation mode, the counter 37 monitors the clock ø 1 applied as the communication clock CLK from outside the LSI, and checks the presence or absence of the malfunction thereof by the use of the monitor clock $S_{CLK}$ from the frequency divider 34. Upon detecting the malfunction, it delivers a reset signal to pertinent portions.

The receiver circuit 13c is constituted by a receiving buffer made of a register 40, a serial-parallel converter (S-P converter) 41, etc. The reception data Rx received through the serial communication is converted by the S-P converter 41 into parallel data, which is stored in the register 40.

The transmitter circuit 13d is constituted by a register 42, a transmitting buffer 43 made of a register 43, and a parallel-serial converter (P-S converter) 44 such as multiplexer. The transmission data Tx written into the register 42 through the data bus 31 by the corresponding computer is delivered to the P-S converter 44 through the register 43 being the transmitting buffer and is thereby converted into serial data, which is transmitted.

The comparison circuit 13e is constituted by comparators 45, 46 and an AND gate 47. The first reception data received by the receiver circuit 13c is set in the comparator 45, and is compared with data held in the register 43 (transmitting buffer) of the transmitter circuit 13d. Besides, part of identifying information data to be described later, held in the register 43 of the transmitter circuit 13d is set in the comparator 46, and it is compared with head data held in the register 40 of the receiver circuit 13c.

When the contents of the data items agree as the result of the comparison in the comparator 45, the output of this comparator changes from a high level to a low level, which is delivered to the register 40 of the receiver circuit 13c and the P-S converter 44 of the transmitter circuit 13d and also to the AND gate 47. Besides, when the contents of the data items agree as the result of the comparison in the comparator 46, the output of this comparator similarly changes from the high level to the low level, which is delivered to the AND gate 47.

Subsequently, the output of the AND gate 47 is applied to the interrupt generator circuit 13f as the signal of an interrupt factor through the AND gate 33 of the master/slave selector circuit 13a.

The interrupt generator circuit 13f is constituted by an OR gate 48 and a flip-flop 49. The communication finish signal from the communication control circuit 13b and the output from the master/slave selector circuit 13a are applied to the OR gate 48, and the flip-flop 49 is triggered by the output of the OR gate 48, thereby to produce the interrupt signal INT.

The flip-flop 49 is reset in accordance with the fact that the CPUs accepting the interrupt signal INT have written data into predetermined addresses. Thus, any of interrupt signals of edge trigger or level trigger different depending upon the individual CPUs can be coped with.

Next, the operations of the embodiment based on the above construction will be described.
(Operation of Master ECU)

In the master ECU 1a, the master/slave select signal $H_{SEL}$ of "0" is input from the CPU 10a to the master/slave selector circuit 13a of the LSI for communication 13. Thus, the LSI for communication 13 is brought into the master operation mode, in which the upper 4 bits of the address bus 32, for example, are decoded in conformity with the memory space of the CPU 10a so as to access various functions concerning the communication by the use of the lower 4 bits.

By way of example, the reception data Rx (4 bytes) is stored in the addresses 00H–03H of the lower 4 bits, and the CPU 10a reads the addresses, whereby data held in the register 40 (receiving buffer) of the receiver circuit 13c is loaded through the data bus 31. Besides, when the CPU 10a writes data into the addresses 04H–08H of the lower 4 bits, the transmission data Tx (5 bytes) is written into the register 42 of the transmitter circuit 13d through the data bus 31.

Further, a transmitting speed is determined by data which has been written into an address 0AH by the master CPU 10a. The transmitting speed is set when the communication clock CLK is delivered as an output owing to the frequency division of the system clock ø 2 by the frequency divider 34 of the master/slave selector circuit 13a.

In the master operation mode, the clock ø 1 is normally "0" without being used. The communication clock CLK produced from the frequency divider 34 as left intact is delivered to the exterior via the OR gate 35 and is supplied to the respective LSIs for communication 13 of the slave ECUs 1b–1d.

At the same time, the master/slave select signal $H_{SEL}$ is input to the AND gate 33 of the master/slave selector circuit 13a so as to normally hold the output thereof at "0". Thus, irrespective of the signal applied from the comparison circuit 13e to the AND gate 33, the interrupt is generated by the transmission finish signal from the comparator 38 of the communication control circuit 13b as will be described later. Also, the signal $H_{SEL}$ is input to the counter 37 of the communication control circuit 13b, thereby to bring this counter 37 into a stopped state and to hold the output thereof at the high level.

Subsequently, the communication is started as soon as the transmission data Tx has been written by the master CPU 10a, and the pulses of the communication clock CLK, in other words, the number of bits of the transmission data Tx are/is counted by the counter 36 of the communication control circuit 13b. Simultaneously, the synchronizing signal is output to the S-P converter 41 of the receiver circuit 13c and the P-S converter 44 of the transmitter circuit 13d, whereby the serial data items in a predetermined format are transmitted from the master ECU 1a to the individual slave ECUs 1b–1d, and necessary data items are received.

As shown in FIG. 4, the transmission data is composed of 5 bytes MDATA1–MDATA5. The data MDATA1 of the first byte and the data MDATA2 of the second byte constitute the identifying information data. More specifically, the data MDATA1 of the first byte is used for transmitting the ECU No. of any slave ECU requested the transmission of data (for example, identifying information data; bits 6 - 4 which indicate the slave ECU 1b being the engine controller), and the kind of the requested data (for example, identifying information data; bits 3—LSB which indicate engine speed data and suction air flow data).

Subsequently, the data MDATA2 of the second byte is used for transmitting the ECU No. of any slave ECU as an addressee to which data is to be transmitted from the master ECU (bits 6 - 4), and the kind of the data to-be-transmitted (bits 3—LSB). The remaining 3 bytes are used for transmitting the data calculated by the master CPU 10a, for example, the data of the fuel injection pulse width Ti.

Meantime, when the count number of the pulses of the communication clock CLK has reached 40 bits in the counter 36 of the communication control circuit 13b, the output of this counter 36 comes into agreement with the comparison data (40 bits) of the comparator 38, and the output of this comparator 38 changes from the high level to the communication finish signal of the low level. Thus, the output of the AND gate 39 is inverted from the high level to the low level, to reset the counter 36. Also, the output of the comparator 38 is input to the OR gate of the interrupt generator circuit 13f, to form an interrupt factor. Then, the transmission of the 5-byte data is finished.

In the interrupt generator circuit 13f, one input to the OR gate 48 is the output from the AND gate 33 of the master/slave selector circuit 13a, and this output is normally held at "0". Therefore, when the output of the comparator 38 of the communication control circuit 13b has been inverted from the high level to the low level, an input to the flip-flop 49 is inverted from the high level to the low level, and the flip-flop 49 is triggered by the falling edge of the low level input to generate the interrupt signal INT. Thus, an interrupt is applied to the master CPU 10a, and the reception data Rx is accepted.

In this way, the transmission data of 5 bytes (40 bits) is sent from the master to each slave by one time of communication, and the interval of at least 2 clock periods is set between the end of the communication and the start of the next communication.

(Operation of Slave ECU)

On the other hand, regarding each of the slave ECUs 1b–1d, the master/slave select signal $H_{SEL}$ to be applied to the master/slave selector circuit 13a of the LSI for communication 13 is set at "1", and this LSI for communication 13 is used in the slave operation mode.

More specifically, when the master/slave select signal $H_{SEL}$ is set at "1", the frequency divider 34 divides the frequency of the system clock ø 2 and produces the monitor clock $S_{CLK}$. This monitor clock $S_{CLK}$ is a clock whose period has a length of at least ½ of that of the period of the communication clock CLK supplied as the clock ø 1 from the master ECU 1a, and it is delivered from the OR gate 35 and is input to the communication control circuit 13b.

Incidentally, the communication clock CLK delivered from the OR gate 35 is also supplied to the exterior of the LSI for communication 13 and can be utilized by the other slave ECUs.

Each of the slave CPUs 10b–10d writes the transmission data Tx into the register 42 of the transmitter circuit 13d beforehand so as to make ready for communication. In this case, the transmission data Tx to be written into the addresses 04H– 08H consists of 4 bytes (on the slave side, the address 04H is not used). As shown in FIG. 4, the first data SDATA1 of the transmission data is the identifying information data indicating the ECU No. of the slave ECU to transmit the data (bits 6 - 4), and the kind of the data to-be-transmitted (bits 3—LSS).

Meantime, when the communication has been started by the master ECU 1a, each of the slave ECUs 1b–1d receives data from the master ECU 1a and transmits no data from this slave ECU side at the first byte. Here, the reception data MDATA1 of the first byte from the master ECU 1a and the data SDATA1 of the first byte in the register 43 being the transmitting buffer are compared in the comparator 45 of the comparison circuit 13e.

By way of example, let's consider a case where the content of the data MDATA1 of the first byte from the master ECU 1a indicates that data is requested of the slave ECU 1b, and that the kind of the requested data is the engine speed data. In this case, when the data SDATA1 of the first byte prepared by the slave ECU 1b in advance has agreed with the above content, the output of the comparator 45 changes from the high level to the low level, a transmission command is given to the P-S converter 44 of the transmitter circuit 13d. Then, the transmission of the data from the transmitter circuit 13d to the master ECU 1a is immediately started, while the data is input to the register 40 of the receiver circuit 13c.

Subsequently, the data MDATA2 from the master ECU 1a to be stored in the register 40 has the MSB (bit 7) cleared to "0" by the output from the comparrator 45. Accordingly, whether or not the data has been transmitted to the master ECU 1a can be decided at the occurrence of the interrupt, by checking the MSB of the data MDATA2 in the register 40.

In addition, the output of the comparator 45 is input to the AND gate 33 of the master/slave selector circuit 13a through the AND gate 47. Then, since one input of the AND gate 33 is the master/slave select signal "1", the output thereof changes from the high level to the low level, which is input to the OR gate 48 of the interrupt generator circuit 13f.

In this case, neither of the other slave ECUs 1c, 1d performs transmission because the data SDATA1 of the first byte prepared disagrees with the reception data MDATA1 of the first byte from the master ECU 1a. The slave ECU 1b transmits the data SDATA2–SDATA4 of 3 bytes subsequently to the above data SDATA1 (=MDATA1), successively in synchronism with the communication clock CLK supplied from the master ECU 1a.

Meantime, when the count number of the pulses of the communication clock CLK by the counter 36 of the communication control circuit 13b has reached 40 bits, the communication finish signal at the low level is produced from the comparator 38 and is input to the OR gate 48 of the interrupt generator circuit 13f.

In a case where data has been transmitted to the master ECU 1a, or where the ECU No. of the reception data MDATA2 of the second byte from the master ECU 1a has been found to agree with that of the addressee by comparing the reception data MDATA2 in the comparator 46 of the comparison circuit 13e, in other words, when a low-level signal forming an interrupt factor is delivered from at least one of the comparators 45, 46 of the comparison circuit 13e, one input of the OR gate 48 of the interrupt generator circuit 13f becomes the low level.

Consequently, the flip-flop 49 is triggered by the falling edge of the output signal of the comparison circuit 13e or the communication finish signal of the communication control circuit 13b, and the interrupt signal is produced from the interrupt generator circuit 13f. Then, necessary data is loaded in the corresponding one of the slaves CPUs 10b–10d, and new transmission data is written into the register 42 of the transmitter circuit 13d.

In contrast, in a case where data has not been transmitted to the master ECU 1a and where data is not to be transmitted from the master ECU 1a to the addressee, either, the output from the comparison circuit 13e remains at the high level, and consequently, one input of the OR gate 48 of the interrupt generator circuit 13f remains at the high level. Therefore, even when the communication finish signal from the communication control circuit 13b is input to the interrupt generator circuit 13f, no interrupt is generated. That is, since any signal forming an interrupt factor is not output from the comparison circuit 13e, no operation is carried out, and the next communication is awaited.

Further, regarding the communication between the master ECU 1a and each of the slave ECUs 1b–1d, the communication clock CLK is monitored by the counter 37 of the communication control circuit 13b. When noise or the like has mixed into the communication clock CLK to incur the miscount of the communication clock CLK on the side of each of the slave ECUs 1b–1d, the communication is once ended. Here, the interval of the communication clock CLK exists at least 2 clock periods before the beginning of the next communication, so that the monitor clock $S_{CLK}$ of at least 3 clock periods is detected in the above interval. Then, the reset signal of the low level is produced from the counter 37 to reset and initialize the pertinent portions, and any erroneous data is prevented from being loaded.

Incidentally, the interrupt signal INT from the interrupt generator circuit 13f is reset by writing any desired data into an address 09H.

(Data Communicating Steps)

Next, the steps of the data communications between the master ECU 1a and the slave ECUs 1b–1d will be described in conjunction with the flow charts of FIGS. 5 and 6.

(Communicating Steps of Master ECU)

The flow chart in FIG. 5 shows the communicating steps of the master ECU 1a. First, at a step S101, a transmitting speed is set in the LSI for communication 13 through the data bus 31 by the master CPU 10a, and at a step S102, data items of 5 bytes, namely, the No. of an addressee ECU and the kind of data (controlling data, or transmission request data) are set in the LSI for communication 13 by the master CPU 10a.

Subsequently, when the data items of 5 bytes from the master CPU 10a have been set, the step S102 is followed by the step S103, at which the communication channel is started by the LSI for communication 13 so as to initiate communication immediately.

Next, at a step S104, the pulses of the communication clock CLK in the number of 40 and the data items of 5 bytes set at the step S102 are transmitted to the individual slave ECUs 1b–1d. When the communication has finished, a step S105 proceeds at which the LSI for communication 13 brings the interrupt terminal of the master CPU 10a to the low level so as to start the interrupt processing of the master CPU 10a.

Besides, when the control flow advances to a step S106, the master CPU 10a writes any desired data into a predetermined address for the LSI for communication 13 and restores its interrupt terminal to the high level, whereupon the control flow advances to a step S107.

At the step S107, the master CPU 10a reads reception data of 4 bytes from the LSI for communication 13. Thereafter, the control flow returns to the step S102 so as to make ready for the next communication. By the way, the controlling data such as fuel injection pulse width Ti is calculated on the basis of the reception data while the LSI for communication 13 is communicating.

(Communicating Steps of Slave ECU)

On the other hand, FIG. 6 shows the communicating steps of the individual slave ECUs 1b–1d. At a step S201, the data of the monitor clock $S_{CLK}$ is set in the LSI for communication 13 through the data bus 31 by each of the slave CPUs 10b–10d, and at a step S202, the communication clock CLK and data are received from the master ECU 1a.

Subsequently, the control flow advances to a step S203, at which the communication clock CLK is compared with the monitor clock $S_{CLK}$ set at the step S201. When the rising edges of the monitor clock $S_{CLK}$ have been detected at least three times within the time interval of the low level of the communication clock CLK, it is decided that the communication clock CLK has a malfunction ascribable to the mixing of noise or the like. The control flow advances to a step S204, at which the LSI for communication 13 is reset, whereupon the control flow is returned to the step S202.

On the other hand, in a case where the rising edges of the monitor clock $S_{CLK}$ have not been detected at least three times within the time interval of the low level of the communication clock CLK at the step S203, the communication clock CLK is decided as being normal, and the control flow advances to a step S205. Here, whether or not a data transmission request is designated by the master ECU 1a is decided from the first identifying information data, namely, the data MDATA1 of the first byte sent from the master ECU 1a.

In the presence of the transmission request by the master ECU 1a, the step S205 is followed by a step S206, at which the data items SDATA1–SDATA4 prepared beforehand are transmitted to the master ECU 1a.

In the absence of the designation of the transmission request by the master ECU 1a, the step S205 is followed by a step S207, which decides whether or not the count number of the communication clock CLK has reached 40 pulses.

In a case where the communication clock CLK has not reached the 40 pulses at the step S207, the control flow returns from this step S207 to the step S202, at which the next data is received from the master ECU 1a. On the other hand, in a case where the communication clock CLK has reached the 40 pulses, the control flow advances from the step S207 to a step S208, which resets the counter for the communication clock CLK and which is followed by a step S209.

At the step S209, whether or not the data transmission to the master ECU 1a has been performed is decided. In the presence of the data transmission to the master ECU 1a, the control flow advances to a step S210, which clears the MSB (bit 7) of the data MDATA2 received from the master ECU 1a and which is followed by a step S212.

On the other hand, in the absence of the data transmission to the master ECU 1a at the step. S209, the control flow advances from this step S209 to a step S211. Here, whether or not data to the addressee itself is received is decided on the basis of the identifying information data MDATA2 sent from the master ECU 1a. In a case where the data to the addressee is received, the step S211 is followed by the step S212.

Subsequently, when the control flow advances from the step S210 or the step S211 to the step S212, the LSI for communication 13 brings the interrupt terminal of the corresponding one of the slave CPUs 10b–10d to the low level so as to start interrupt processing, whereupon the control flow advances to a step S213.

At the step S213, each of the slave CPUs 10b–10d writes any desired data into a predetermined address for the LSI for communication 13, thereby to bring the interrupt terminal thereof back to the high level, whereupon the control flow advances to a step S214.

Here at the step S214, when the physical quantity data items MDATA3–MDATA5 for the addressee itself, for example, the fuel injection pulse width Ti for the slave ECU 1b have/has been received together with the identifying information data MDATA2 from the master ECU 1a, these data items MDATA2–MDATA5 of 4 bytes are read.

In addition, when the MSB of the data MDATA2 from the master ECU 1a is "0", that is, when the data transmission to the master ECU 1a has been performed, the slave CPU sets new transmission data in the LSI for communication 13, whereupon the control flow returns to the step S202.

On the other hand, in a case where no data for the addressee is received at the step 211, the control flow returns to the step S202, at which the input of the next data from the master ECU 1a is awaited.

Regarding the slave ECU 1b, for example, the parameters such as engine speed N and suction air flow Q are calculated from the input signals of the sensors (parameter detecting means), and these data items are transmitted in response to the transmission request by the master ECU 1a. Also, the drive signal of the fuel injection pulse width Ti which is the controlling data received from the master ECU 1a is delivered to the injector 17 being the component at a predetermined timing.

Thus, the calculative processes of the controlling data items having heretofore been executed independently by a plurality of controllers can be executed by the master ECU 1a, and data etc. common to the individual slave ECUs 1b–1d are managed in centralized fashion, so that the loads of the slave ECUs 1b–1d are sharply lightened.

Moreover, the individual slave ECUs 1b–1d can receive from the master ECU 1a the controlling data items which are based on the operating condition parameters of the sensors not applied to themselves. Therefore, each of the sensors need not be connected to two or more of the slave ECUs 1b–1d, and the number of wiring lines to be laid within the system can be sharply reduced.

By the way, although the communications among the computers have been described as the clocked synchronizing system in this embodiment, the present invention is not restricted thereto, but it is also applicable to communications in the start-stop synchronizing system.

As described above, according to the present invention, an electronic control system for a motor vehicle comprises a plurality of parameter detecting means for detecting operating condition parameters of the motor vehicle; a master controller from and to which communication lines are laid; and a plurality of slave controllers which convert the operating condition parameters detected by said parameter detecting means and various data items processed in said control system, into serial data items and transmit them to said master controller through said communication lines, and which control a plurality of components installed on the motor vehicle, on the basis of data items received from said master controller; said master controller being connected with said plurality of slave controllers through said communication lines, to calculate controlling data items on the basis of various data items received as inputs from the respective slave controllers, and converting the controlling data items into the serial data items and transmitting them to said respective slave controllers through said communication lines. Therefore, the invention achieves such excellent effects that all the data items in the system can be centralizedly managed by the master controller, to realize the integration of the control system and to enhance the controllability thereof, and that the number of wiring lines to be laid for the individual controllers can be reduced.

What is claimed is:

1. An electronic control system for a motor vehicle having, a plurality of parameter detecting means for sensing operating conditions of said motor vehicle and for generating an operating condition signal, and a plurality of actuating means for controlling said motor vehicle, the system comprising:

a plurality of slave control means responsive to said operating signals for controlling said actuating means and for producing a control signal;

master control means connected to each slave control means through a common serial bus for providing a respective control signal requesting said control signal to each of said slave control means for controlling of said actuating means;

said slave control means converts a requested control signal into a serial data signal and transmits said serial data to said master control means during a reception of said respective control signal;

said master control means integrally calculates an operating condition of the vehicle from said serial data signal and produces said respective control signal based on said operating condition of the vehicle so as to minimize transmission volume of said signals between said master and slave control means and to effectively control said motor vehicle; and said slave control means comprising an ABS controller, an automatic transmission controller and an engine controller.

2. The electronic control system according to claim 1 wherein:

said parameter detecting means comprising an air flow meter, a crank angle sensor, a vehicle speed sensor and a wheel speed sensor.

3. The electronic control system according to claim 1, wherein:

said actuating means comprising an A/T actuator, an ABS brake actuator, a fuel injector and an ignition coil.

4. An electronic control system for a motor vehicle having, a plurality of parameter detecting means for sensing operating conditions of said motor vehicle and for generating an operating signal, and a plurality of actuating means for controlling said motor vehicle, the system comprising:

a plurality of slave control means responsive to said operating signal for controlling said actuating means and for producing a control signal;

master control means responsive to said control signal and connected to each slave control means for providing respective control signal to be used in calculation by said slave control means to control said actuating means; and a communication circuit provided in each said slave control means and said master control means and connected to each other for converting said control signal into a serial form in order to transmit said respective control signals between said slave control means and said master control means in said serial form so as to reduce an occupancy of a property of the system by a data transmission task.

5. The electronic control system according to claim 4, wherein said communication control circuit further comprises;

a communication control circuit responsive to a communication clock signal for counting a data transmission number and for producing a communication finish signal;

a receiving circuit responsive to said control signal in serial form for converting into parallel form to store to a receiving register;

a transmitter circuit for converting said control signal in a transmitting register into serial form and for generating a control signal in serial form;

a comparing circuit for comparing first reception data of said control signal stored in said receiving register with said control signal stored in said transmitting register and for producing an output signal; and an interrupt generator circuit responsive to said communication finish signal and said output signal for triggering a flip-flop and for producing an interrupt signal in order to write a data into a predetermined address of a main memory of one of said main control means and said slave control means in which said communication control means provided so as to establish easily and fast access, and improve communication.

6. The electronic control system according to claim 4, wherein said communication circuit further comprises;

a selector circuit responsive to a select signal and a system clock of said master control means for providing a communication clock signal.

7. The electronic control system for a motor vehicle according to claim 4, wherein said communication circuit comprises:

a selector circuit responsive to a select signal and a system clock of said slave control means for providing a monitor clock; and a communication control circuit responsive to said monitor clock and said communication clock signal for detecting a malfunction of transmission and for producing a reset signal to said master control means.

8. A electronic control system for a motor vehicle which provides a plurality of equipment controlled by each electric controller having a microprocessor, a memory, an I/O interface and a bus-line connecting said microprocessor, said memory and said I/O interface with each other, the system comprising:

a master controller providing a microprocessor, a memory, and a bus-line connecting said microprocessor and said memory with each other for processing a control data in order to control said each electronic controller;

a sensor connected to at least one of said each electronic controller for sensing conditions being regarded to control said each equipment and for transmitting a parameter signal corresponding said condition to said each controller to be processed in said each electronic controller;

a communication line providing a serial data bus for transmitting a data in serial form; and a communication circuit provided to each of said master controller and said each electronic controller, and connected to each other through said serial data bus, which communication circuit provide a transmitting register connected to each microprocessor through said bus-line for storing a transmitting data, a parallel/serial converter directly accessing to said transmitting register for converting said transmitting data into serial form to transmit toward another of said electronic controllers through said serial data bus, a serial/parallel converter for converting a received data from said other controller through said serial data bus into parallel form, a receiving register connected to said serial/parallel convertor for storing said received data and further connected to each microprocessor through said bus-line, and a interrupt signal generator responsive to an end of data transmission for generating interrupt signal to microprocessor to read out said received data from said receiving register.

9. The electronic control system for a motor vehicle according to claim 8 wherein said communication circuit further comprises:

clock divider responsive to clock signal of said microprocessor for generating communication clock signal; and communication control circuit responsive to said communication clock signal for counting said communication clock signal to detect said end of data transmission.

10. The electronic control system for a motor vehicle according to claim 8 wherein said communication circuit, further comprises:

comparison circuit for comparing said transmitting data and said receiving data and for detecting data transmission incomplete to prohibit said interrupt generator generate interrupt signal.

11. The electronic control system for a motor vehicle according to claim 10 wherein said transmitting circuit transmits said serial data synchronized with said communication clock signal.

12. The electronic control system for a motor vehicle according to claim 8 wherein said communication circuit constructed on a one integrated circuit chip.

13. The electronic control system for a motor vehicle according to claim 12 wherein said integrated circuit chip of communication circuit provides a select signal terminal for alternating a master function and a slave function.

* * * * *